Figure 1:
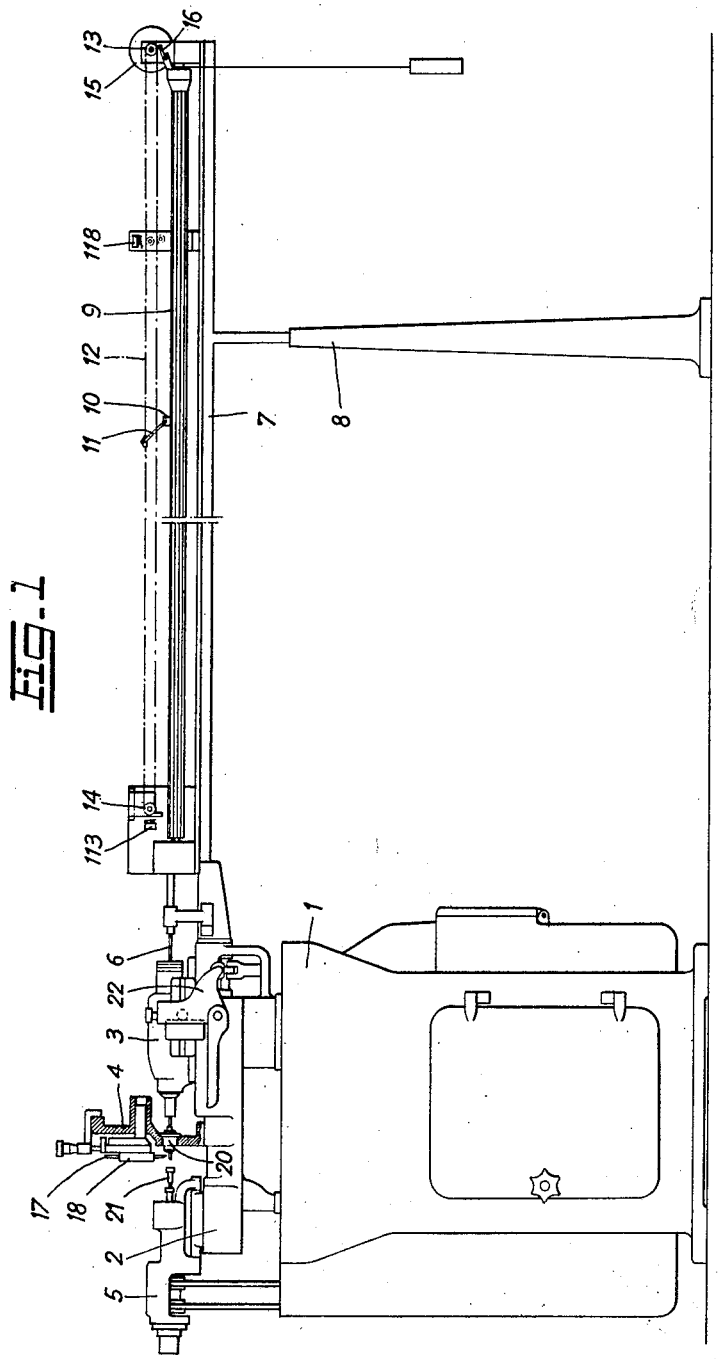

Nov. 24, 1964    G. E. MEGEL ETAL    3,157,895
SAFETY DEVICE FOR USE WITH AUTOMATIC LATHES
Filed May 14, 1962    5 Sheets-Sheet 1

Nov. 24, 1964  G. E. MEGEL ETAL  3,157,895
SAFETY DEVICE FOR USE WITH AUTOMATIC LATHES
Filed May 14, 1962  5 Sheets-Sheet 4

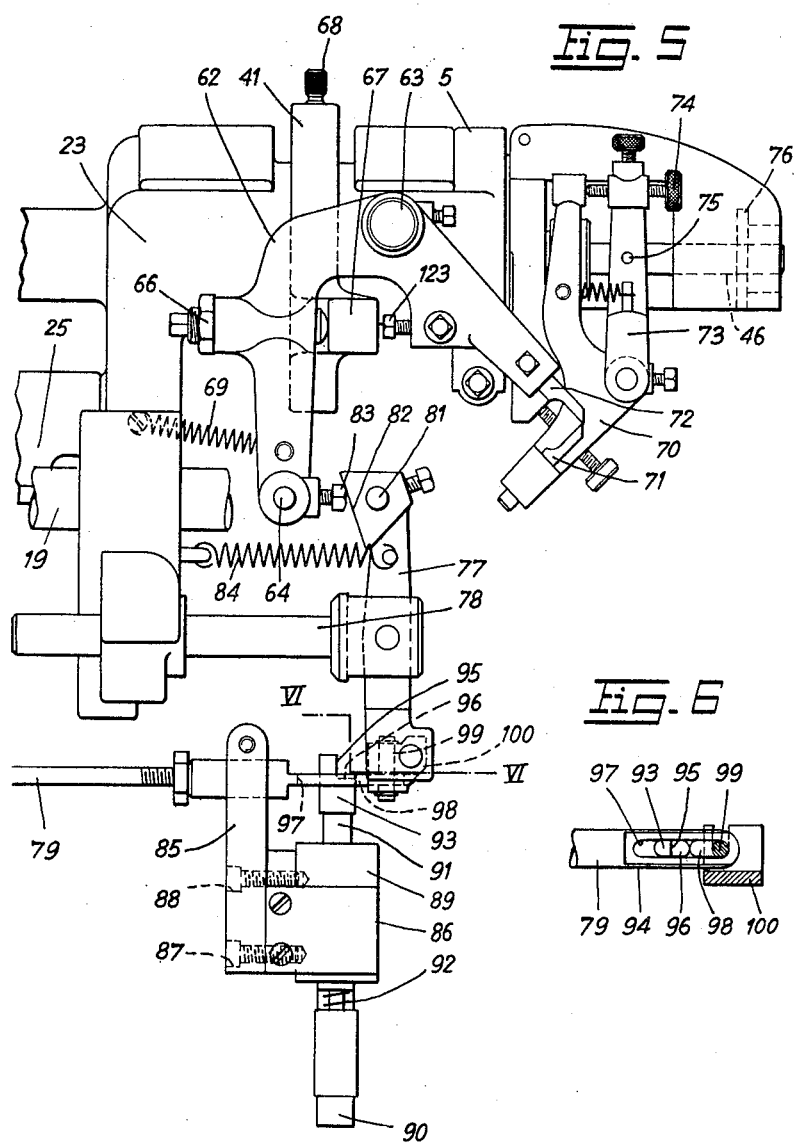

United States Patent Office 3,157,895
Patented Nov. 24, 1964

3,157,895
SAFETY DEVICE FOR USE WITH AUTOMATIC LATHES
Guillaume Ernest Megel and Henri Mancia, Moutier, Canton of Bern, Switzerland, assignors to Usines Tornos Fabrique de Machines Moutier S.A., Moutier, Switzerland, a company of Switzerland
Filed May 14, 1962, Ser. No. 194,612
Claims priority, application Switzerland, May 16, 1961, 5,694/61
5 Claims. (Cl. 10—89)

This invention relates to safety devices for use with automatic lathes comprising a thread-cutting tool provided to follow its own helical path, and in particular to safety devices for use with automatic lathes arranged for machining workpieces out of a bar of stock and provided moreover with cycling means adapted for controlling all the operations of the lathe.

The safety devices of the type considered hereinafter, which are known in the art, are set under the control both of the lathe cycling means usually comprising a camshaft, and the thread-cutting tool, which can be a tap or a die, and these safety devices are arranged so as to stop the lathe cycling means when the thread-cutting tool does not follow its own helical path, i.e. as soon as the thread-cutting tool does no longer work satisfactorily. The known safety devices accordingly have the advantage of preventing the lathe from producing uncompletely machined workpieces.

The automatic lathes of the type referred to above have recently been provided with an automatic feeding device, which automatically supplies a new bar of stock to the lathe headstock, when the bar driven thereby is exhausted.

The lathes provided with such an automatic feeding device could, however, up till now not also be provided with a safety device of the type mentioned above, for the following reason:

To remove the bar remnant from the lathe headstock and to supply a new bar of stock thereto, the automatic feeding devices mentioned above usually need a time longer than one cycle of the lathe cycling means. In other words, the lathe has to operate without stock during more than one cycle when a new bar of stock has to be fed to its headstock by the automatic feeding device. Moreover, the known safety devices of the type mentioned above are actually arranged so as to stop the lathe cycling means when the thread-cutting tool does not follow its own helical path after having been put into engagement with the workpiece by said cycling means. It results therefrom that the lathe cycling means and accordingly also the lathe operation would be stopped each time a new bar of stock would be supplied to the lathe headstock, if the lathe were also provided with a safety device of the type mentioned above. In other words, the provision of a safety device of the type considered would have completely destroyed the advantage which the automatic feeding device permits to be obtained, since the operation of the lathe would actually always be stopped precisely at the moment at which the feeding device enters in action in order to keep the lathe in operation without the help of a worker.

It is therefore an object of this invention to provide an automatic lathe comprising both a thread-cutting tool and an automatic feeding device with a safety device arranged so that the lathe operation will be stopped if the thread-cutting tool fails to carry out its working operation in the desired manner.

Another object of the invention is to provide an automatic lathe having a thread-cutting tool and an automatic feeding device with a safety device which prevents the lathe from producing uncompletely machined workpieces, without requiring therefor a permanent supervision of the workpieces produced by the lathe.

It is still another object of the invention to provide a lathe comprising a thread-cutting tool and an automatic feeding device with a safety device which will stop the lathe operation as soon as the thread-cutting tool does no longer carry out its working operation in the desired manner, but which will be set out of operation when the automatic feeding device supplies a new bar of stock to the lathe headstock, even if the automatic feeding device has to remain in action during several cycles of operations of the lathe to supply the new bar of stock to the lathe headstock.

Still further objects of the invention will become apparent in the course of the following description.

One embodiment of the safety device according to the invention is represented diagrammatically and by way of example in the accompanying drawings.

Figure 2:
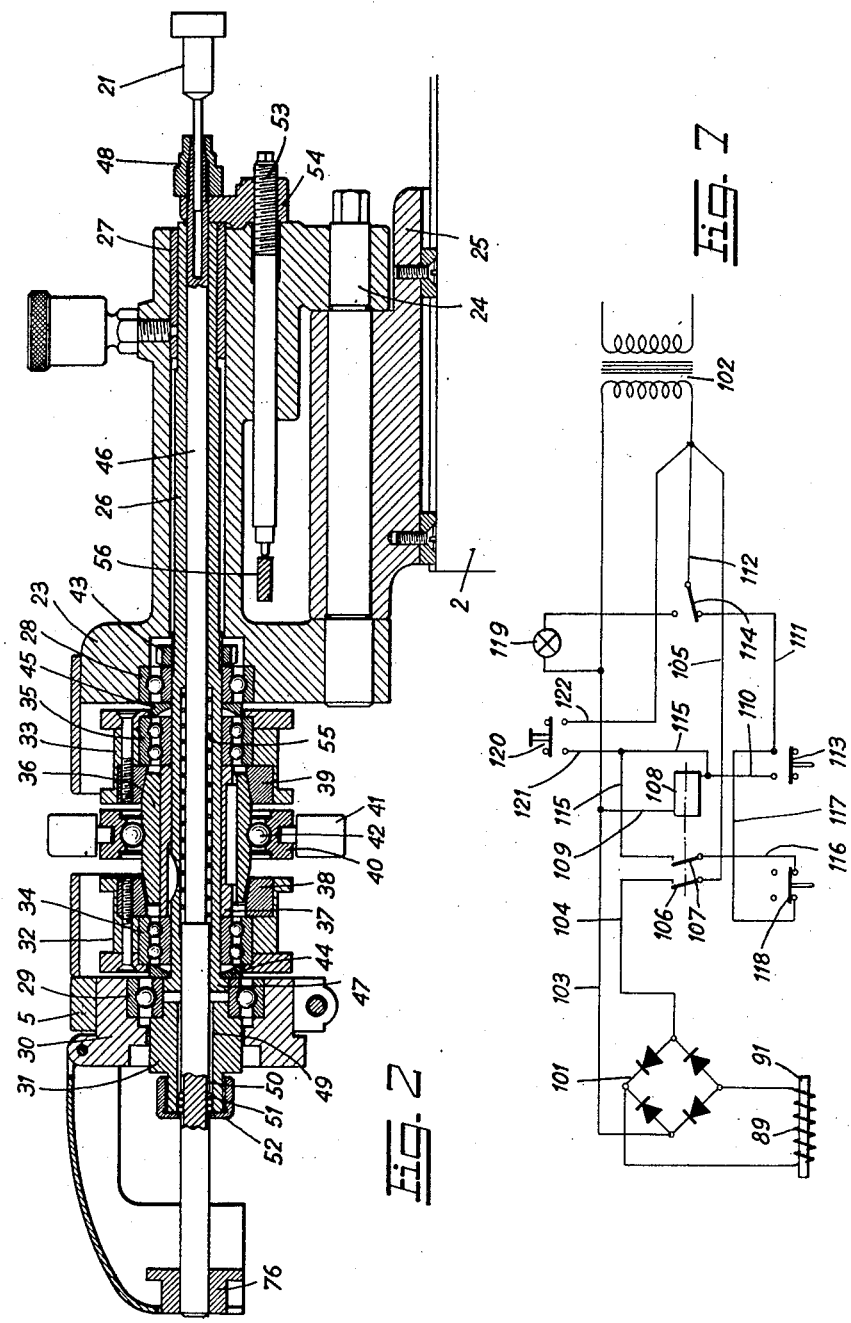
Figure 3:
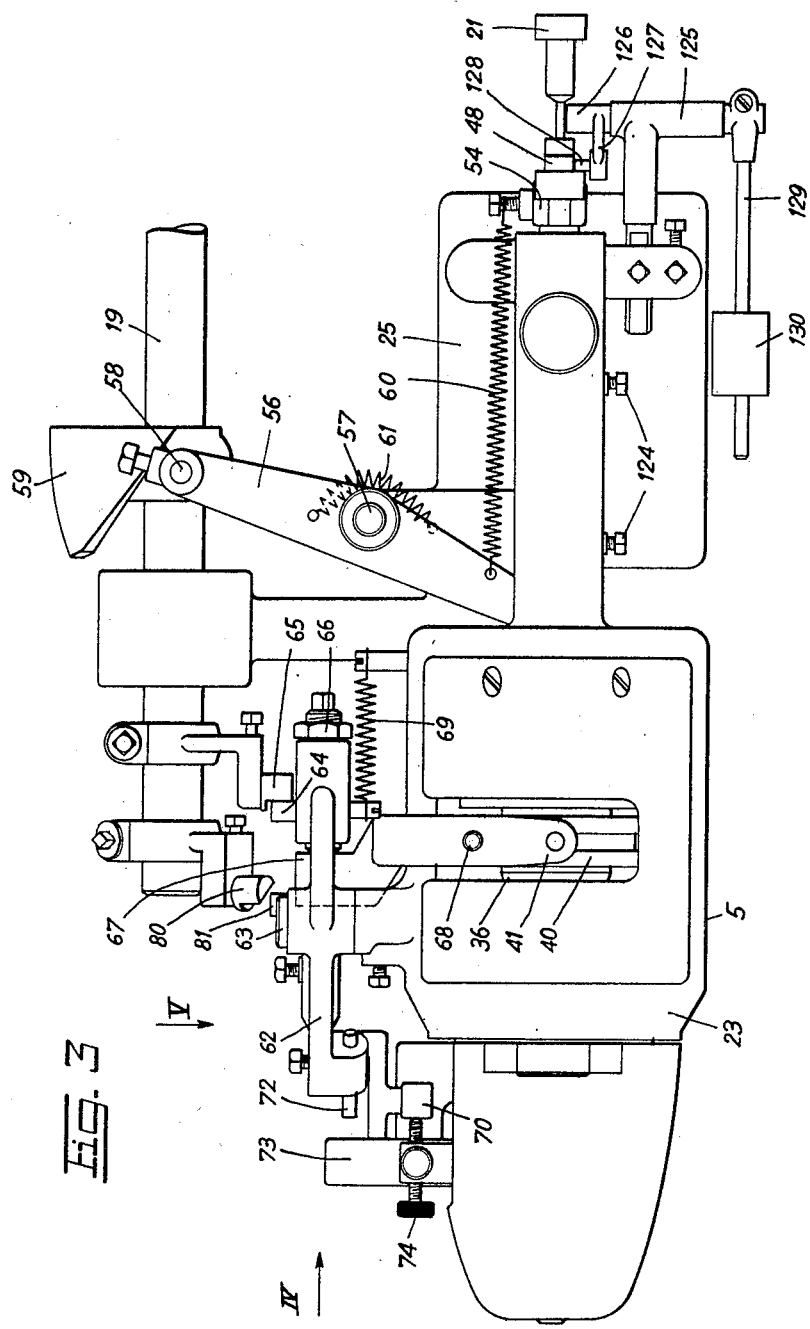
Figure 4:
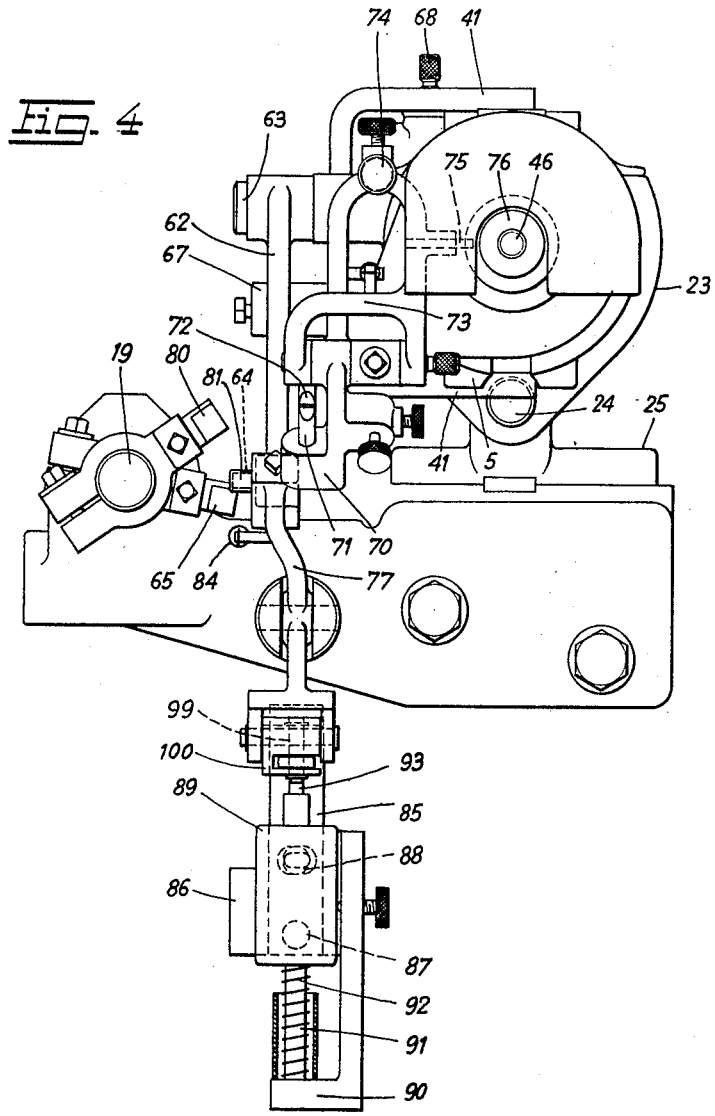

In the drawings:
FIG. 1 is a side elevational view on a reduced scale of the lathe which the safety device according to the invention is associated with;
FIG. 2 is a part sectional view of the lathe of FIG. 1;
FIG. 3 is a plan view of the lathe part shown in FIG 2;
FIG. 4 is an elevational view in the direction of arrow IV in FIG. 3 and on a larger scale of the lathe part shown in FIGS. 2 and 3;
FIG. 5 is an elevational view of the same lathe part and on the same scale as that of FIG. 4 but taken in the direction of arrow V in FIG. 3;
FIG. 6 is a sectional view along line VI—VI of FIG. 5, and
FIG. 7 is a wiring diagram of the control means of the safety device according to the invention.

The automatic lathe represented in FIG. 1 is of a conventional type which is well known to those skilled in the art. It comprises a stand 1 on which a frame 2 is arranged. A lengthwise shiftable headstock 3, a bracket 4 carrying a plurality of radially extending tools 17 and an auxiliary apparatus 5 comprising a thread-cutting die 21, are mounted on the frame 2.

The headstock 3 is arranged so as to drive a bar of stock 6 in rotation. The bar 6 is therefore coaxial to the headstock and its front portion extends through a guiding sleeve 20 carried by bracket 4. A portion of the bar 6 projects in front of the sleeve 20 and extends within the field of the radial tools 17 and of the thread-cutting die 21. The rear portion of bar 6 is supported by an automatic feeding device arranged behind the lathe headstock 3 and carried by a longitudinal bar 7 supported by a stand 8. The automatic feeding device comprises a revolving drum 9, the axis of which is parallel to that of the headstock 3. The drum 9 comprises a plurality of longitudinally extending cylindrical lodgings regularly arranged around its axis. A bar of stock is located in each one of the drum lodgings. The bar 6 in particular extends in that lodging of drum 9 which is coaxial to the lathe headstock. It will be observed that the drum lodging supporting bar 6 is situated in the vertical plane passing through the drum axis and that it extends above the latter. Bar 6 is pushed forward by a pusher also extending within said drum lodging, behind bar 6. At its rear end, this pusher is provided with a plate 10 projecting outside the drum lodging, through a longitudinal slot thereof. This plate 10 is jointed to a driving member 11 which can be moved forward and rearward along the whole length of drum 9. Member 11 is connected to an endless chain 12 supported by two sprocket-wheels 13 and 14 and driven by a servo-motor 15.

Bar 6 will have been pushed forward as far as possible when member 11 passes around the sprocket-wheel 14 and will then be pulled backward by the lower portion of chain 12. During this backward motion, the bar remnant will be removed from headstock 3. Member 11 thus moves plate 10 of the bar pusher backward until the same has reached its rearmost position. This member 11 is then automatically disconnected from plate 10 and it moves around the sprocket-wheel 13 while simultaneously actuating an indexing mechanism 16 which causes drum 9 to rotate about its axis through such an angle that the bar of stock extending within the drum lodging adjacent to that which has previously carried bar 6 will come into alignment with the lathe headstock axis. Member 11 moves then forward again under the pulling action of the upper portion of the endless chain 12 and it catches the pusher plate extending within the drum lodging which has just come into alignment with the headstock and pushes the corresponding bar of stock forward until its front portion enters the headstock 3.

The radially extending tools 17 are carried by slides 18 which are controlled in the conventional manner by cycling means comprising a camshaft 19 (FIG. 3) and lever means actuated thereby. Camshaft 19 also controls the axial displacement of headstock 3 in the usual manner, i.e. by means of a cam (not shown) and a lever 22.

The auxiliary apparatus 5 (FIG. 2) is arranged on the lathe frame 2 opposite headstock 3. This apparatus comprises a framework 23 which can be oriented at will around an axle 24 with respect to a support piece 25 keyed and screwed on the lathe frame 2. Locking screws 124 (FIG. 3) are provided to lock the apparatus frame 23 in a predetermined position around axle 24. A rotary spindle 26 is journalled within frame 23. In the front portion of apparatus 5 this spindle is carried by a bushing 27; a ball bearing 28 having its outer race set with force fit into a lodging of frame 23 carries the middle portion of spindle 25, and the rear portion thereof is similarly carried by a second ball bearing 29, the outer race of which is rigidly fixed to a body member 30 fixed itself to frame 23. A guiding sleeve 31 engaging the inner race of bearing 29 constitutes a rear extension of spindle 26. The latter is driven in rotation by either one of the two pulleys 32, 33, each carried by a ball bearing 34, 35, respectively, the inner races of these bearings being mounted on the portion of spindle 26 extending between the bearings 28 and 29. The driving action of the pulleys 32, 33 is transmitted to the spindle 26 by means of a clutching sleeve 36 provided with conically bevelled end portions and mounted on a sleeve 37 keyed onto spindle 26, so that sleeve 36 can be shifted at will in axial direction from a rearward position to a forward position and vice versa. Sleeve 36 is also keyed on to sleeve 37 so that the spindle 26 is fixed for rotary motion to sleeve 36.

When sleeve 36 is in its rear position, its rear conical bevel engages a corresponding surface portion of a clutch ring 38 secured to pulley 32 and when sleeve 36 is in its fore position its fore conical bevel is similarly clutched to pulley 33 by means of a clutch ring 39 similar to ring 38, said ring being secured to pulley 33.

An outer ring 40 surrounding sleeve 36 is joined to a stirrup 41. This ring 40 is itself connected to sleeve 36 by means of a row of balls 42, so that it is fixed for axial motion to sleeve 36 while permitting a rotary motion of the latter together with spindle 26. Stirrup 41 and ring 40 control the axial motion of the clutching sleeve 36.

The spindle 26 is axially held in place with respect to frame 23 by means of a nut 43 which bears against the inner race of bearing 28. At its rear end the spindle 26 is provided with a collar 47 against which a washer 44 located between collar 47 and bearing 34 of pulley 32 is pressed. A similar washer 45 is provided between the bearings 35 and 28, so that the sleeve 37 is pressed between the inner races of bearings 34 and 35 under the action of the nut 43 which presses the washer 44, the inner race of bearing 34, the sleeve 37, the inner race of bearing 35 and the washer 45 between the rear collar 47 of spindle 26 and the inner race of bearing 28.

A cylindrical rod 46 extends within spindle 26. The front end of this rod is bored axially and spliced so as to form a chuck capable of receiving the thread-cutting die 21, which can rigidly be fixed to rod 46 by means of a locking nut 48. As shown in FIG. 2, the rod 46 extends throughout spindle 26 as well as through guiding sleeve 31. Its rear end carries a stop 76. Rod 46 can be moved in an axial direction with respect to spindle 26 while remaining rigidly fixed thereto for rotary motion. Therefore, longitudinal grooves 49 are provided in the inner cylindrical surface of guiding sleeve 31 and similar grooves 50 are provided in the portion of rod 46 extending within sleeve 31. Balls 51 simultaneously engage one of the sleeve grooves 49 and one of the rod grooves 50, thus connecting rod 46 to spindle 26 for rotary motion while enabling free axial motion of rod 46 with respect to spindle 26. The balls 51 are retained axially in place in their corresponding grooves by a cap piece 52 screwed onto the rear portion of guiding sleeve 31. As shown in FIG. 2, a control rod 53 extends through an axial bore of frame 23 and carries a driving member 54, screwed thereon and engaging a portion of rod 46 located behind the locking nut 48. Rod 53 is provided to move rod 46 forward against the action of a return spring 55 which is positioned between spindle 26 and rod 46. Spring 55 is compressed when rod 46 is moved to the right in FIG. 2. The return spring 55 is moreover assisted by a device with adjustable weight carred by frame 23. As shown in FIG. 3 this device is supported by a stand 125, the position of which can be adjusted at will. A horizontal shaft 126 is journalled within a transverse bored portion of stand 125 and it carries at one of its ends an arm 127 provided with a finger 128 and at its other end a rod 129. A weight 130 can be moved at will along rod 129. FIG. 3 also shows that nut 48 moves finger 128 to the right when it moves itself in this direction. The weight 130 is then lifted by rod 129 which rotates with shaft 126.

The working operations of the thread-cutting die 21 are controlled by cams secured on to the camshaft 19. The controlling action of these cams is transmitted to die 21 by motion transmitting means shown in FIG. 3. These means first comprise the horizontal lever 56 pivoted at 57 on a laterally extending arm of a support piece 25. At one of its ends lever 56 is provided with a follower 58 cooperating with a cup-shaped cam 59 secured to camshaft 19. The other end of lever 56 extends behind the rear end of control rod 53 (FIG. 2), so that the latter is pushed forward when follower 58 slides on the ascending curve of cam 59. A return spring 60 attached by one end to lever 56 and by its other end to the driving member 54 prevents lever 56 from leaving rod 53 when follower 58 slides along the descending curve of cam 59 and when lever 56 is then pulled back into its resting position by a return spring 61. Lever 56 and cam 59 thus cause die 21 to move axially toward the workpiece at the moment of the cycle at which it has to start its working operation. This forward motion of die 21 is controlled by lever 56 and cam 59 up to the point at which die 21 engages the workpiece. When the die 21 has reached its foremost position under the controlling action of lever 56 and cam 59, the spring 55 is however not yet entirely compressed and the rod 46 can still move further in the same direction. During the thread-cutting operation the die 21 and the rod 46 follow the helical path cut by the die in the workpiece thus further compressing spring 55. During this last axial motion of rod 46 the lever 56 and the driving member 54 as well as the control rod 53 either remain in their advanced positions or move backward into their resting positions.

The means controlling the operation of die 21 moreover comprise a lever 62 pivotally mounted on a horizontal stud 63 fixed to the frame 23. This lever 62 is provided with a feeler member 64 and it is actuated by a cam 65 set on shaft 19. The lever 62 also comprises an adjustable control member 66 acting on an arm 67 of stirrup 41. The latter is pivotally mounted on a vertical axle 68 fixed to frame 23 and it controls the clutching means (36, 38, 39) in the manner described above. When the lever 62 is not rocked by cam 65, a spring 69 holds it at rest in such a position that the clutching sleeve 36 engages ring 38 of pulley 32. The latter is driven in the same direction as the bar of stock 6 but at a lower speed. The cam 65 is adjusted in such a manner that it will actuate the lever 62 and consequently the stirrup 41 at the moment at which cam 59 starts pushing rod 46 and die 21 towards the working position of the latter. As that moment the sleeve 36 connects the spindle 26 to the pulley 33, which also rotates in the same direction as bar 6 but at a higher speed. When the die 21 has reached its working position and engages the workpiece, it accordingly rotates at a higher speed than this workpiece. When the die 21 has been pushed by lever 56 so far that it engages the workpiece, the lever 62 is locked and kept in rocked position by a lever 70 pivotally mounted on a horizontal stud fixed to frame 23 (FIGS. 4 and 5). The lever 70 carries a nose 71 which cooperates with a similar nose 72 provided at one end of lever 62. An auxiliary lever arm 73 is rockably mounted on the same stud as lever 70. The lever arm 73 is provided with an adjustable screw 74 by means of which the position of arm 73 relative to lever 70 can be adjusted at will. Arm 73 also carries an actuating pin 75 which extends into the path of stop 76 fixed to rod 46 at the rear end thereof. The relative positions of stop 76 and pin 75 are so adjusted that the former engages the latter when the die 21 has cut a thread of the desired length on the workpiece. FIG. 5 shows that when stop 76 engages pin 75, the nose 71 is removed from nose 72 thus releasing lever 62 and permitting spring 69 to rock the same back toward its resting position. During this return motion of lever 62, a screw 123 fixed thereto engages the laterally extending arm of stirrup 41 and causes the spindle 26 and consequently the rod 46 to be connected to the low speed pulley 32. Since the die 21 now rotates slower than bar 6, it will be unscrewed from the workpiece and then moved back to its resting position by spring 55. When die 21 has left the workpiece, the descending curve of cam 59 comes opposite the feeler 58 (if it did not come into this position already before), so that the rod 46 will be brought in its resting position shown in FIG. 2.

The function of the auxiliary apparatus 5 has been described in detail because it is necessary for the comprehension of the function of the safety device according to the invention. This safety device comprises a first actuating member constituted by a lever 77 (FIG. 5), pivotally mounted at the end of a supporting rod 78 fixed to the lathe frame 2. It also comprises a second actuating member constituted by a control rod 79 which actuates conventional clutch means (not shown) of the camshaft 19, when this rod 79 is moved to the left in FIG. 5 from the position represented in this figure, thus causing the camshaft 19 to stop. The safety device is temporarily submitted in a manner described hereinafter to the controlling action of a cam (FIG. 4) set on shaft 19. When cam 80 engages a feeler 81 fixed to one end of lever 77, it causes this lever to rock clockwise in FIG. 5. Lever 77 is also provided at its upper end with an inclined camming surface 82 which is permanently maintained by a spring 84 anchored to frame 2 and attached to lever 77 in abutting engagement with the head of a screw 82 fixed to the lower end of lever 62.

During the whole thread-cutting operation, i.e. as long as lever 62 remains in the position represented in FIG. 5, the feeler 81 is held in the path of cam 80. As soon as lever 70, which constitutes a first releasing member of the safety device, is actuated by stop 76 thus causing lever 62 to connect spindle 26 to the low speed pulley 32, the feeler 81 is moved to the left in FIG. 5, so that it can no longer be engaged by cam 80. If the die 21 happens to be defective, and does not cut a thread on the workpiece after it has been brought into engagement therewith by lever 56, the rod 46 does not move beyond the position into which it has been urged by this lever 56 and the stop 76 does, accordingly, not actuate levers 73 and 70. The lever 62 as well as lever 77 thus remain in their positions shown in FIG. 5 while spindle 26 and rod 46 further rotate at high speed under the action of pulley 33. Feeler 81 accordingly remains in the path of cam 80. The latter is adjusted on shaft 19 in such a manner that it comes opposite feeler 81 shortly after the moment of the cycle at which stop 76 should rock lever 70 and release lever 62. If the latter has however not been released, because of a defect of die 21, the cam 80 engages feeler 81 and moves the same to the right in FIG. 5. The lower end of lever 77, which is operatively connected to control rod 79 by means described hereinafter, causes this control rod to be moved to the left, thus unclutching the camshaft 19 and causing the same to stop and to interrupt all the operations of the lathe.

It appears from the functions described above, that the die 21 will fail at least once to engage a workpiece when a new bar of stock will have to be supplied by the automatic feeding device to the lathe headstock, because the elimination of the bar remnant from the headstock and the introduction of a new bar of stock into this headstock usually takes a time substantially exceeding one cycle of operation of the lathe. During the feeding operation the lever 56 will thus move rod 46 forward and the lever 62 will cause this rod to rotate at high speed. Since the die 21 does not engage a workpiece during this cycle, it will remain in the position in which it will have been brought by lever 56. The stop 76 will thus not actuate levers 73 and 70 and fail to release lever 62. The safety device would thus remain under the controlling action of cam 80 and accordingly cause shaft 19 to be unclutched, if the safety device did not comprise further releasing means which are described hereinafter and put it out of action during the operation of the automatic feeding device.

Rod 79 carries at its rear end an adjustable support 86 fixed by screws 87, 88 to an attaching lug 85 secured to rod 79. The coil of an electromagnet 89 is mounted on support 86. A vertical arm 90 of support 86 extends downwards below the coil of magnet 89 and serves as a support for a movable core 91 constituting the armature of magnet 89 and extending through the coil of magnet 89. The core 91 is urged upwards by a spring 92 and held thereby in the position of FIG. 5 when no current flows through the coil of magnet 89. Upon energization of magnet 89, the core 91 is pulled downwards against the action of spring 92. Core 91 is provided at its upper end with a cylindrical connecting member 93 which constitutes a second releasing member of the safety device. A cutout is provided in the upper portion of member 93 so as to form a vertical plane face 95 and a horizontal plane shoulder 96. Member 93 extends in an elongated opening 97 provided in a flat portion 94 constituting the rear end of rod 79. An actuating member 98 also extends into opening 97 behind member 93. This actuating member 98 is fixed by a pin 99 to a support 100 pivotally mounted on a horizontal stud provided at the lower end of lever 77.

When the core 91 stays in its upmost position under the action of spring 92, the shoulder 96 of member 93 is located within opening 97, so that the actuating member 98 is in abutting engagement with a plain portion of member 93. In this position the rod 79 is operatively connected to lever 77 so that it moves to the left when lever 77 rocks clockwise and to the right when said lever rocks in the reverse direction.

In the position represented in FIG. 5, the rod 79 has already moved to the left through some distance and it is ready to unclutch the camshaft 19 upon a further motion in the same direction. If lever 77 is rocked clockwise by cam 80, it will thus immediately cause the camshaft 19 to be unclutched.

When the magnet 89 is energized, the core 91 is pulled downwards to such an extent that the shoulder 96 of member 93 stands below the flat poriton 94 of rod 79. After this downward motion of core 91, the upper cutout portion of member 93 still remains in slot 97, but if lever 77 rocks clockwise from the position represented in FIG. 5, the actuating member 98 carried thereby does not reach the vertical plane face 95 of member 93, so that rod 79 will not be pushed to the left. In other words, the removed member 93 causes the operative connection between lever 77 and rod 79 to be interrupted and the actuating member 98 freely moves within slot 97 every time the cam 80 engages feeler 81 and as long as magnet 89 is energized, i.e. during the whole operation of the automatic feeding device. To obtain the result desired it accordingly suffices to keep the magnet 89 is energized condition during the whole operation of the automatic feeding device.

As shown in the diagram of FIG. 7 the coil of magnet 89 is fed by a bridge 101 connected to the secondary winding of a transformer 102 by means of a line 103 and lines 104, 105. A contact 106 inserted between the two last mentioned lines is closed when the automatic feeding device starts its operation and opened as soon as that operation has ended. The movable element of contact 106 as well as that of a contact 107 form part of a relay 108, the coil of which is mounted in parallel with bridge 101 by means of a line 109 and lines 110, 111 and 112. A first operable contact 113 is connected between lines 110 and 111 and a commutator 114 connects lines 112 and 111 together when it is in the position represented in FIG. 7, which constitutes the normal position of this commutator. Upon closure of contact 113, the relay 108 will be energized so that the two contacts 106 and 107 will be closed. The electro-magnet 89 will thus also be energized and the core 91 pulled downwards. The contact 107 is a holding contact. Once it has been closed, it shunts contact 113 through lines 115, 116, 117 and a second operable contact 118, which is normally closed. The contact 113 thus only needs to be actuated during a short period to energize magnet 89 and keep the same energized until contact 118 is actuated. The actuation of the latter interrupts the holding circuit of relay 108 so that the latter is disenergized upon actuation of contact 118 and releases contacts 106 and 107.

The first operable contact 113 is located as shown in FIG. 1 in the vicinity of the sprocket-wheel 14, around which the driving member 11 of the automatic feeding device passes after having pushed bar 6 into its foremost position and before pulling the bar remnant backwards. The contact 113 is moreover arranged so as to be actuated by the driving member 11 itself. As regards the second operable contact 118, it is mounted in the vicinity of a rear portion of chain 12, so that it will also be actuated by the driving member 11 when the latter will pass opposite the same after having fed a new bar of stock to the lathe by introducing the front portion of this bar into the lathe guiding sleeve 20.

The wiring diagram represented in FIG. 7 shows that the control circuits of the safety device according to the invention further comprise a lamp 119 connected between one pole of the commutator 114 and line 103. When the commutator 114 has been actuated so as to feed the lamp 119, the safety device will no longer automatically be put out of action upon actuation of contact 113, since the lines 111 and 110 are out of circuit. When commutator 114 has been displaced, the safety device can only be put out of action by continuously pressing a pusher 120. This pusher 120 closes a contact and causes the relay 108 to be energized through lines 121 and 122.

As stated above, the commutator 114 is normally in the position represented in FIG. 7, so that lamp 119 is out of circuit. Moreover, when the lathe is machining workpieces out of a bar of stock, the relay 108 is out of circuit so that magnet 89 is disenergized. Member 93 is accordingly in the position represented in FIG. 5, in which it operatively connects lever 77 to rod 79, thus causing the lathe operation to be immediately stopped if die 21 happens to be defective. Before member 11 pulls an exhausted bar backward, it actuates contact 113 and accordingly causes relay 108 to be energized. The holding contact 107 keeps this relay in energized condition so that magnet 89 keeps core 91 in its lower position.

When the bar remnant is removed from the lathe guiding sleeve 20, the lathe advantageously remains in working condition and its cycling means further control cycles of operations, however without producing workpieces, i.e. without stock. At the beginning of the first cycle, during which the lathe operates without stock, the lever 62 is released and the spindle 26 clutched to the low speed pulley 32. During this first cycle without stock, the cam 65 causes lever 62 to rock and thus clutches spindle 26 to pulley 33. During that motion, the lever 77 rocks clockwise and its actuating member 98 freely slides within slot 97 while passing above shoulder 96 of the second releasing member 93. This lever 77 thus comes in the position represented in FIG. 5, but it is not operatively connected to rod 79. During the same time, the cam 59 actuates lever 56 so as to urge die 21 toward its operating position. Since the latter does not engage a workpiece, it remains in that position until cam 59 allows it to return to its resting position. The nose 71 will thus not be removed from nose 72 by stop 76, so that the cam 80 will then engage feeler 81 of lever 77 and cause the latter to rock clockwise from the position shown in FIG. 5. The actuating member 98 of this lever freely moves further to the left within slot 97 and comes at most in contact with the vertical plane face 95 of member 93 without causing rod 79 to unclutch and to stop the camshaft 19. At the end of this first cycle without stock, the spindle 26 is still clutched to the high speed pulley 33 and the levers 62, 70 and 77 are still in the positions represented in FIG. 5. They will remain in these positions as long as the automatic feeding device is working. During the operation of this device the driving member 11 moves the bar remnant removed from the lathe headstock to the rear of drum 9 and indexes, then, this drum. Said driving member 11 is then moved by chain 12 around the rear sprocket wheel 13 and is pulled forward again. At the beginning of its forward motion, member 11 is connected to the pusher plate of the new bar of stock, which has come into alignment with the lathe headstock upon indexing drum 9, so that the new bar is driven by member 11 toward the headstock 3, until the front portion of this new bar comes behind the chuck of the headstock. Since the camshaft 19 is still rotating, the chuck of headstock 3 will once happen to be opened, so that chain 12 will be able to push the new bar of stock through the headstock chuck and will urge the same into the guiding sleeve 20, where it will be ready for machining a first workpiece thereout. During the machining operation of this first workpiece, the stop 76 will remove nose 71 from nose 72 and cause the spindle 26 to be clutched to the low speed pulley again. On feeding the bar of stock for the second workpiece, the driving member 11 passes opposite contact 118 and actuates the same thus disenergizing relay 108 and magnet 89. The core 91 of the latter will thus be moved upward under the action of spring 92, so that member 93 will reestablish the operative connection between lever 77 and rod 79, so that the safety device will be in action again.

To check the operation of the safety device or to stop the lathe after a bar of stock has been exhausted, it suffices to switch the commutator 114 into the position in which lamp 119 lights. The magnet 89 will thus no longer be energized by member 11 so that the camshaft 19 will be stopped during the first cycle which the lathe will carry out without stock, the stopping action being controlled as described above by cam 80 acting on rod 79 by means of lever 77 and member 93. The operation of magnet 89 can be checked at any time when adjusting the lathe, whichever the position of member 11 may be. Therefore, the commutator 114 is actuated so as to feed lamp 119 and the pusher 120 is pressed. The core 91 must then arrive in its lower position thus enabling the lathe to carry out a complete cycle of operation without stock.

The lamp 119 indicates if the safety device is in action or not. When lamp 119 lights, the safety device is permanently in action and when lamp 119 does not light, the safety device is put out of action during the operation of the automatic feeding device.

In a modification the auxiliary apparatus described could also be provided with further tools such as drills. In this event, the tools of the auxiliary apparatus would be mounted on a rocker or on an indexed drum. The control means of the thread-cutting die and of the safety device would however be the same as in the lathe described.

Moreover, the safety device described would obviously operate in exactly the same manner, if the auxiliary apparatus were provided with a thread-cutting tap instead of with a die.

Still further modifications in the shape, sizes and arrangement of parts will appear obvious to those skilled in the art within the scope of the appended claims.

We claim:

1. For use with automatic lathes arranged for machining workpieces out of a bar of stock and provided with a thread cutting tool provided to follow its own helical path, with cycling means controlling all the operations of the lathe and with a feeding device automatically supplying a new bar of stock when the bar worked on has been exhausted, a safety device having means operatively connecting it to the lathe cycling means and the thread cutting tool so that it is responsive to the controlling action both of the lathe cycling means and of the thread cutting tool to stop these cycling means if the thread cutting tool does not follow its own helical path, said safety device comprising releasing means which upon actuation thereof put it out of action, said releasing means having means operatively subjecting it to the action both of the thread cutting tool when the latter follows its own helical path and of the stock feeding device when the same is operated, thus avoiding stopping the lathe cycling means both when the thread cutting tool works satisfactorily and when there is no stock in the lathe.

2. For use with automatic lathes arranged for machining workpieces out of a bar of stock and provided with a thread cutting tool provided to follow its own helical path, with cycling means controlling all the operations of the lathe and with a feeding device automatically supplying a new bar of stock when the bar worked on has been exhausted, a safety device comprising a first actuating member and a means operatively connecting it to the lathe cycling means so that it is responsive to the controlling action of the lathe cycling means as each cycle thereof, a second actuating member provided to stop the lathe cycling means when it is actuated, a first releasing member actuated by the thread cutting tool when the latter follows its own helical path, said first releasing member, when it is actuated, removing said first actuating member from the controlling action of the lathe cycling means, and a second releasing member movable between an acting position in which it establishes a motion transmitting connection between said first and said second actuating member and a releasing position in which it leaves said first and said second actuating members without any motion transmitting connection therebetween, said second releasing member having means subjected to the controlling action of the stock feeding device so as to be moved to its releasing position when the stock feeding device is operated.

3. A safety device according to claim 2, further comprising an electric circuit, an electromagnet in said circuit, first contact means in said circuit which upon actuation thereof energize said electromagnet, and second contact means in said circuit which upon actuation thereof deenergize said electromagnet, said second releasing member constituting an armature of said electromagnet.

4. A safety device according to claim 3, arranged for use with a lathe provided with an automatic feeding device comprising an endless chain and a driving member successively moved forward and rearward by said endless chain to feed a new bar of stock to the lathe and to remove the bar remnant therefrom, respectively, said first contact means being located at a predetermined place of the travelling path of said driving member so as to be actuated thereby when the latter starts moving rearward.

5. A safety device according to claim 3, arranged for use with a lathe provided with an automatic feeding device comprising an endless chain and a driving member successively moved forward and rearward by said endless chain to feed a new bar of stock to the lathe and to remove the bar remnant therefrom, respectively, said second contact means being located at a predetermined place of the travelling path of said driving member so as to be actuated thereby when the latter has just supplied the lathe with a new stock bar which the lathe is ready to start operating on.

References Cited in the file of this patent

UNITED STATES PATENTS

| | | |
|---|---|---|
| 1,805,998 | Schaerer et al. | May 19, 1931 |
| 2,374,112 | Lloyd | Apr. 17, 1945 |
| 2,669,345 | Brown | Feb. 16, 1954 |
| 2,869,154 | Williams | Jan. 20, 1959 |

FOREIGN PATENTS

| | | |
|---|---|---|
| 1,076,954 | France | Apr. 28, 1954 |